(12) United States Patent
Hou

(10) Patent No.: US 6,898,755 B1
(45) Date of Patent: May 24, 2005

(54) METHOD FOR INCREASING PHYSICAL LAYER FLEXIBILITY IN CABLE MODEM SYSTEMS

(75) Inventor: Victor T. Hou, La Jolla, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 606 days.

(21) Appl. No.: 09/939,129

(22) Filed: Aug. 24, 2001

(51) Int. Cl.$^7$ .............................................. H03M 13/00
(52) U.S. Cl. ..................... 714/784; 375/222; 375/224; 375/326; 375/343; 370/442; 370/395.4; 370/436; 370/282; 370/486
(58) Field of Search ................................. 714/784, 774, 714/755; 370/442, 395.4, 436, 282, 486, 419, 480; 375/222, 224, 326, 343

(56) References Cited

U.S. PATENT DOCUMENTS 6,285,681 B1    9/2001   Kolze et al.

2001/0055319 A1 * 12/2001 Quigley et al. ............. 370/480
2002/0093972 A1 *  7/2002 Hollums et al. ............ 370/419

* cited by examiner

Primary Examiner—Guy J. Lamarre
Assistant Examiner—Dipakkumar Gandhi
(74) Attorney, Agent, or Firm—Harrity & Snyder, LLP (57) ABSTRACT

In a cable modem system, signals are transmitted upstream from a cable modem (CM) to a cable modem termination unit (CMTS) when the subscriber desires to communicate with the headend. The invention described herein is directed to a method and apparatus for increasing the communication channel between the CM and the CMTS. This is accomplished by providing a method and apparatus for increasing physical layer flexibility in cable modem systems. In this manner, the CMTS is capable of assigning burst profiles and granting mini-slots to the CMs according to the CMs' burst profile and robustness level.

21 Claims, 5 Drawing Sheets

OSI Layer Stackup for a DOCSIS Cable Modem

| OSI | DOCSIS | |
|---|---|---|
| HIGHER LAYERS | APPLICATIONS | DOCSIS CONTROL MESSAGES |
| TRANSPORT LAYER | TCP/UDP | |
| NETWORK LAYER | IP | |
| DATA LINK LAYER | IEEE 802.2 | |
| PHYSICAL LAYER | UPSTREAM | DOWNSTREAM |
| | TDMA (MINI-SLOTS) 5-42(65) MHz QPSK/16-QAM | TDM (MPEG) 54(100)-850 MHz 64/256-QAM ITU-T J.83 - ANNEX B(A) |

METHOD FOR INCREASING PHYSICAL LAYER FLEXIBILITY IN CABLE MODEM SYSTEMS

FIELD OF THE INVENTION

The present invention relates to cable modem systems. More particularly, the present invention is directed to a method and apparatus for increasing physical layer flexibility in cable modem systems.

BACKGROUND OF THE INVENTION

Recently, there has been an explosive growth for broadband services. As is well known in the industry, cable modem technology is one of the most popular methods of providing broadband services to subscribers. Cable modem currently competes with technologies such as Asymmetric Digital Subscriber Lines (ADSL). Many in the industry forecast that cable modem systems will be the prevailing technology for providing broadband services.

Figure 1:
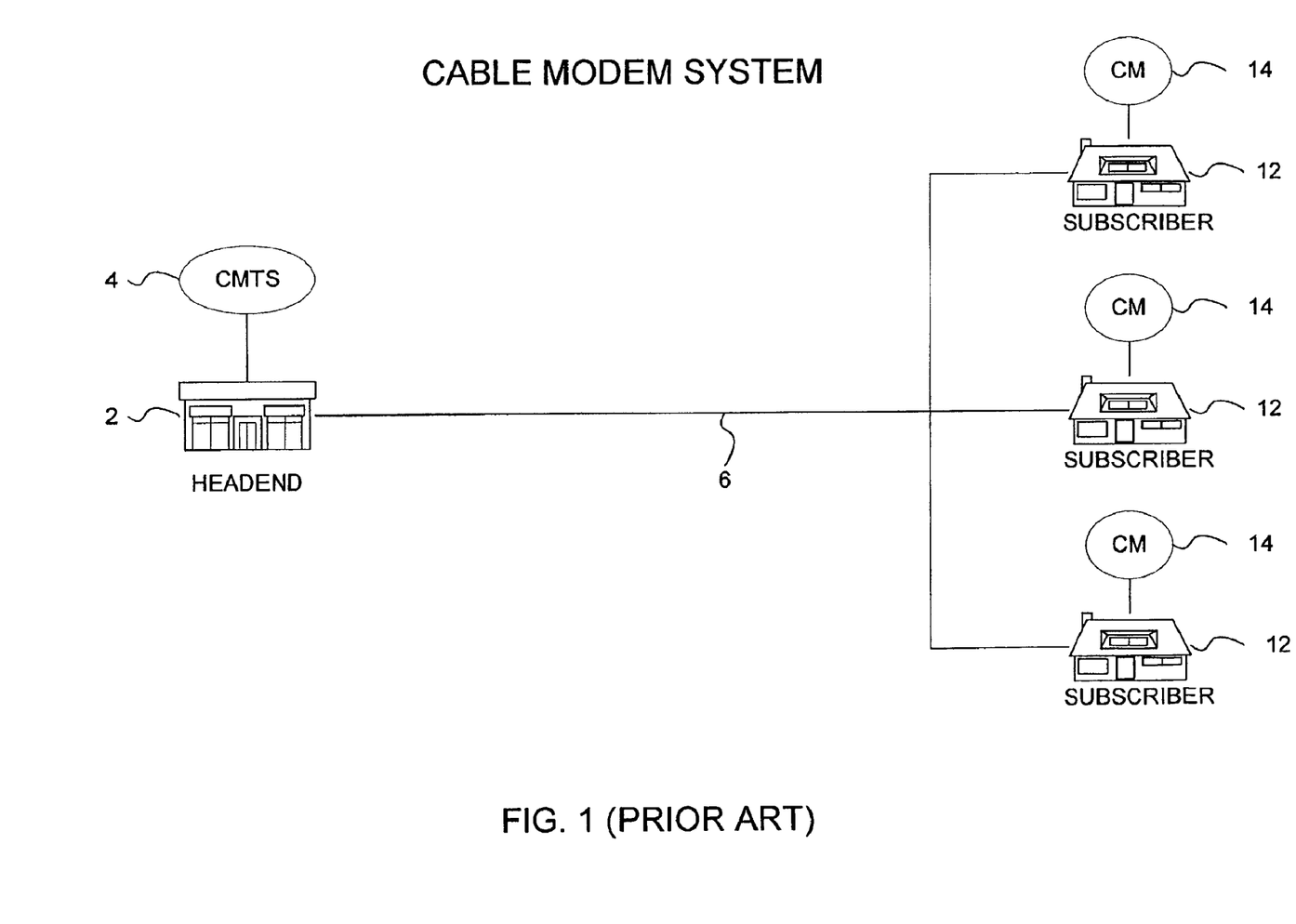
FIG. 1 illustrates a simplified diagram of a conventional cable modem system.

FIG. 1 illustrates a simplified diagram of a conventional cable modem system. In the conventional cable modem system, a headend 2 is connected to multiple subscribers 12 (residence or business) via an access network 6 such as coaxial cable, Hybrid Fiber Coax (HFC), or wireless. The headend 2 is known as the central distribution point for a cable TV (CATV) system. Signals are received at this point from satellites and other sources and rebroadcast to the subscribers 12.

The headend 2 generally includes a Cable Modem Termination System (CMTS) 4 for receiving and delivering signals from and to the subscribers 12. Likewise, there are cable modems (CM) 14 within the subscribers' 12 residences or businesses for receiving and transmitting signals from and to the CMTS 4. In other words, the CMTS 4 exchanges signals with the CMs 14 via the network 6. In between the CMTS 4 and the CM 14 are other known components and functions for computer networking, security, and management.

Data is delivered to the subscriber 12 through channels in the coaxial cable, HFC, or optical fiber to the CM 14 that is installed externally or internally to the subscriber's computer device or television. One channel is used for upstream signals from the CM 14 to the CMTS 4, and another channel is used for downstream signals from the CMTS 4 to the CM 14. When the CMTS 4 transmits signals to the CM 4, it converts these signals into Internet Protocol (IP) packets, which are then transmitted to an IP router for transmission across the Internet. In addition, when the CMTS 4 transmits signals to the CM 14, it modulates the downstream signals for transmission across the cable to the CM 14. The CM 14 can be installed in the subscriber's computer device, which computer device can be hooked up to a local CATV. Typically, the CM 14 attaches to a standard 10BASE-T Ethernet or USB card or PCI bus in the computer device.

Figure 2:
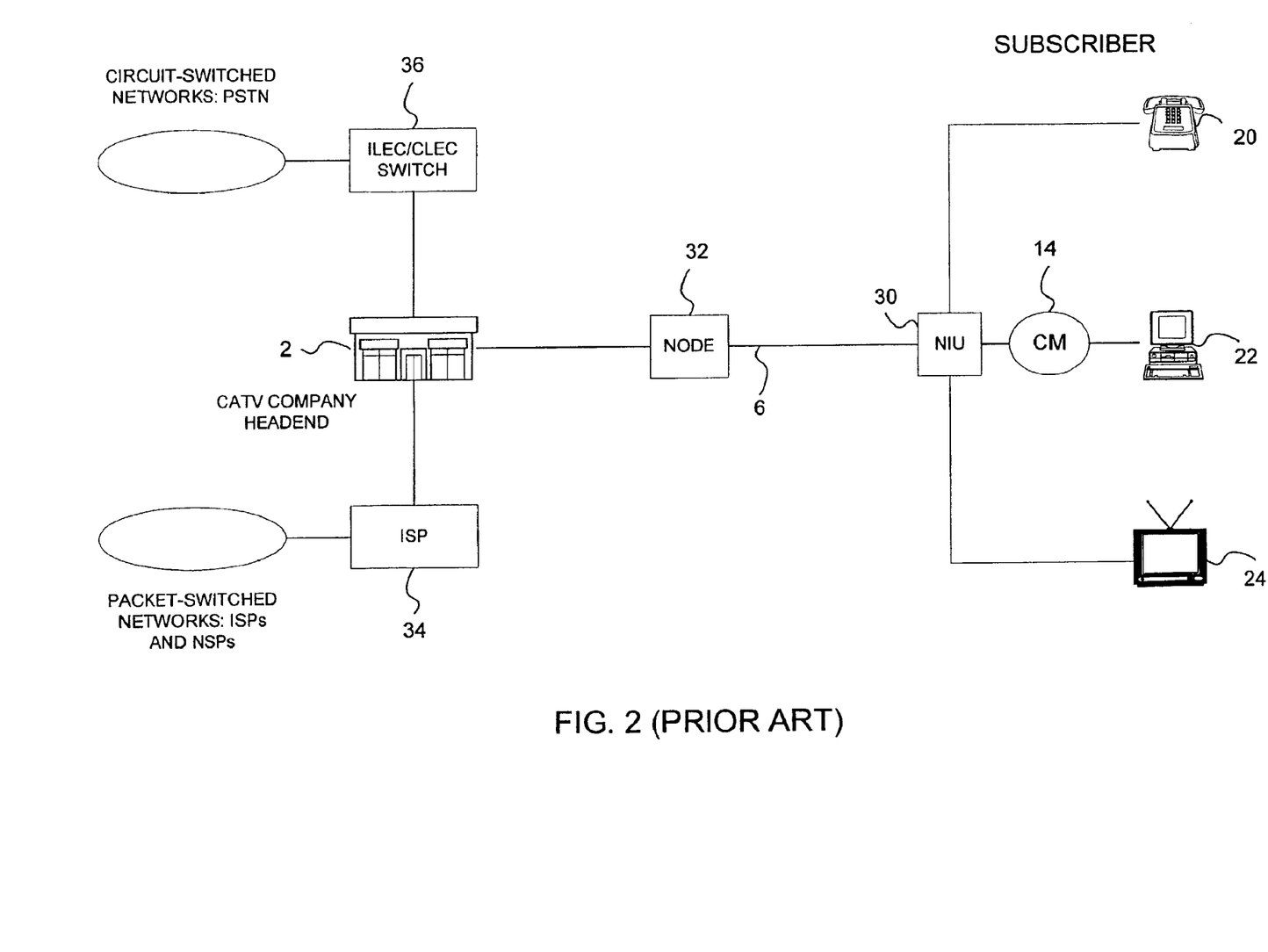
FIG. 2 illustrates a more detailed diagram of a conventional cable modem system.

FIG. 2 illustrates a more detailed diagram of a conventional cable modem system. This example illustrates convergence of video, data, and voice services in the CATV system. The subscriber's residence or business includes a telephone 20, a computer device 22, and a television 24. In this example, the CM 14 is installed with the computer device 22 connected to it, and the television 24 includes the set top box. Television channels are provided through the set top box, which acts as a tuner and demodulator for digital/analog TV services (video). Data is sent and received by the computer device 22 using the CM 14 to access the Internet, which data is packet-switched. All three types of services (video, data, and voice) may be handled through a network interface unit (NIU) 30. The NIU 30 contains electronics that provides the appropriate interface to connected devices, including RF passthrough. The NIU 30 may also include the CM 14 therein.

The NIU 30 is connected to a cable system node 32. The node 32 provides services for as many as a few thousand subscribers and acts as a funnel for consolidating signals carrying digital voice, data and video signals from all subscribers in the direction toward the headend 2. From the node 32, the signals are transmitted to the headend 2, where each service is passed onto the appropriate network.

At the headend 2, the CMTS 4 converts digital signals into the IP, and routes them to the ISP (Internet Service Provider) 34 which, in turn, connects to the Internet. The CATV company may act as the ISP itself. The headend 2 also receives video programming from satellite gateways using a satellite dish. Generally, these signals are downstream with the exception of requests for services such as "pay per view."

The headend 2 routes the voice signal to a telephony head end unit, which formats this signal for telephone switching (circuit-switched). The voice signal is then routed to the party on the receiving end. If the call is sent to a local telephone company customer, then the call is routed to an ILEC or CLEC switch 36 that connects to the traditional telephone networks, the PSTN. If the call is sent to another local customer using the same CATV company's voice service, then the call (digital voice) is routed back through the CATV system. The voice traffic may also be handled through the IP network, and in most cases, will involve both packet-switched and circuit-switched networks.

In the North American CATV system, signals from various sources are each given a 6 MHz slice of the cable's available bandwidth and then transmitted to the subscriber. As mentioned above, coaxial cable or a combination of the coaxial cable and fiber optic can be used to transmit the signals to the subscriber. Simultaneously, data from the Internet can be transmitted downstream on the same cable from the CMTS 4 to the CM 14 using a $6/8$ MHz channel in the $54/100–860$ MHz frequency range depending on North American/European deployment. The modulation can be 64-QAM (defined later herein) with 6 bits per symbol or 256-QAM with 8 bits per symbol.

Upstream data is sent in bursts so that many CMs 14 can transmit on the same frequency. Each CM 14 transmits bursts in time slots that may be either marked as reserved, contention, or ranging. A reserved slot is a time slot that is reserved to a particular CM 14, and no other CM 14 is allowed to transmit in that time slot. The CMTS 4 allocates the time slots to the various CMs 14 through a bandwidth allocation algorithm, which algorithm may be vendor specific.

Time slots marked as contention slots are open for all CMs 14 to transmit. If two CMs 14 decide to transmit in the same time slot, the packets collide and the data is lost. The CMTS 4 will then signal to the CMs 14 that no data was received, and the CMs 14 will try again at some other time. Contention slots are normally used for very short data transmissions such as a request for a number of reserved slots to transmit more data.

Due to the physical distance between the CMTS 4 and the CM 4, the time delay can vary greatly and be in the millisecond range. To compensate, the CMs 14 employ a ranging protocol, that effectively moves the "clock" of the individual CM 14 back or forth to compensate for the delay. To accomplish this task, a number of consecutive time-slots are set aside for ranging. The CMTS 4 measures this and informs the CM 14 a small positive or negative correction value for its local clock. The other purpose of the ranging is to make the CMs 14 transmit at a power level that makes all upstream bursts from the CMs 14 arrive at the CMTS 4 at the same level. This is required for optimum performance of the upstream demodulator in the CMTS 14.

Upstream data sent from the CM 14 to the CMTS 4 can be transmitted on the same cable using varying channel widths up to 3.2 MHz in the 565 MHz frequency range, since the assumption is that most subscribers download more information than they upload. The modulation forms are QPSK (2 bits per symbol) and 16-QAM (4 bits per symbol).

Figure 3:
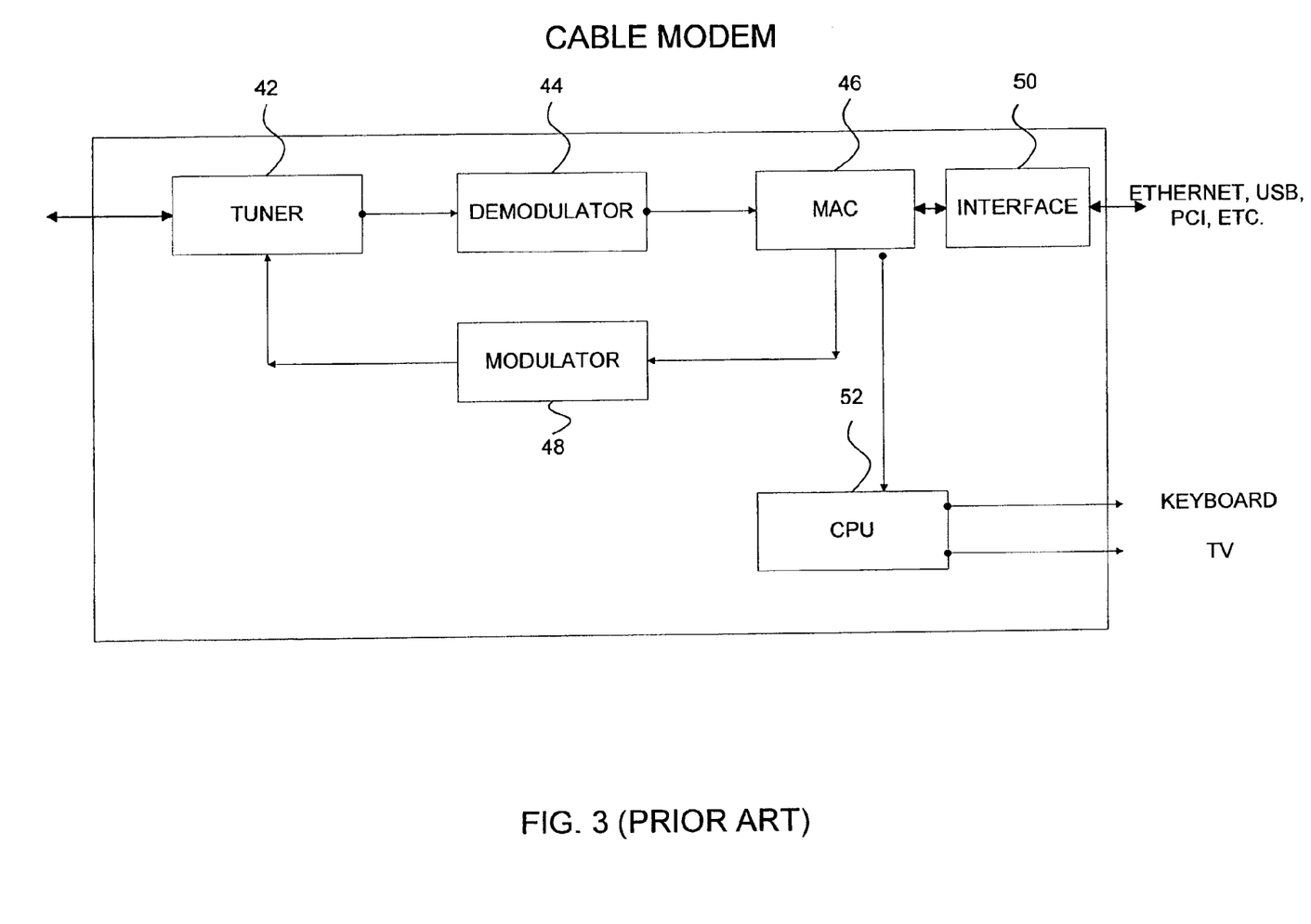
FIG. 3 illustrates a block diagram of a conventional cable modem.

FIG. 3 illustrates a block diagram of a conventional cable modem. Functionally, each CM 14 includes a tuner 42, a demodulator 44, a media access control (MAC) device 46, and a modulator 48. Since the Internet data generally is transmitted through an otherwise unused cable channel, the tuner 42 simply receives the modulated digital signal and passes it to the demodulator 44. The tuner 42 typically includes a diplexer, which allows the tuner 42 to make use of one set of frequencies (generally between 54 and 860 MHz) for downstream traffic and another set of frequencies (between 5 and 42 MHz) for the upstream traffic. The tuner 42 also down converts the RF channel to a fixed lower Intermediate Frequency (IF). After the tuner 42 receives a signal, it is passed to the demodulator 44.

The demodulator 44 includes the following functions and components: A/D converter; QAM demodulator; error correction module; and an MPEG framer. The quadrature amplitude modulation (QAM) demodulator outputs samples of a demodulated baseband signal. The error correction module (e.g., Reed Solomon error correction) then checks the received information so that transmission errors can be found and fixed. In most cases, data is encapsulated into an MPEG transport stream so the MPEG framer is used to properly output MPEG packets.

In the upstream direction, a modulator 48 is used to convert the digital computer network data into radio-frequency signals for transmission. This component is sometimes called a burst modulator, because of the irregular nature of most traffic between the subscriber and the Internet. The modulator 48 includes at least the following functions; a section to insert information used for error correction on the receiving end or Reed Solomon encoding, a QAM modulator, and a digital to analog (D/A) converter.

The MAC 46 is positioned above the upstream and downstream physical layer portions of the CM 14 and is involved with medium access control and management. In the case of the CM 14 the tasks are more complex than those of a normal network interface card. For this reason, in most cases, some of the MAC functions will be assigned to a central processing unit (CPU), either the CPU 52 in the external CM 14, or the CPU of the subscriber's computer device. The data that pass through the MAC 46 is transmitted to the computer interface 50 such as Ethernet, USB, PCI, etc. of the CM 14.

The CMTS 4 will now be described in greater detail. The CMTS 4 receives signals from a group of subscribers on a single channel and routes it appropriately to its destination. The downstream information flows to all connected subscribers, and it is up to the individual network connection to decide whether a particular block of data is intended for it. On the upstream side, information is sent from the subscriber to the CMTS 4. The narrower upstream bandwidth is divided into slices of time, measured in slots, in which subscribers can transmit one "burst" at a time.

The CMTS 4 enables over thousands of subscribers to connect to the Internet through a single 6 MHz channel in the downstream direction. Since a single channel is capable of 30–40 megabits per second of total throughput, this means that subscribers may see far better performance than is available with standard dial-up modems. A digital CATV system is designed to provide digital signals at a particular quality to customer households. On the upstream side, the transmit power of the burst modulator in CMs 14 is adjusted appropriately by the CMTS 4 to provide the proper signal strength for robust transmission.

Figure 4:
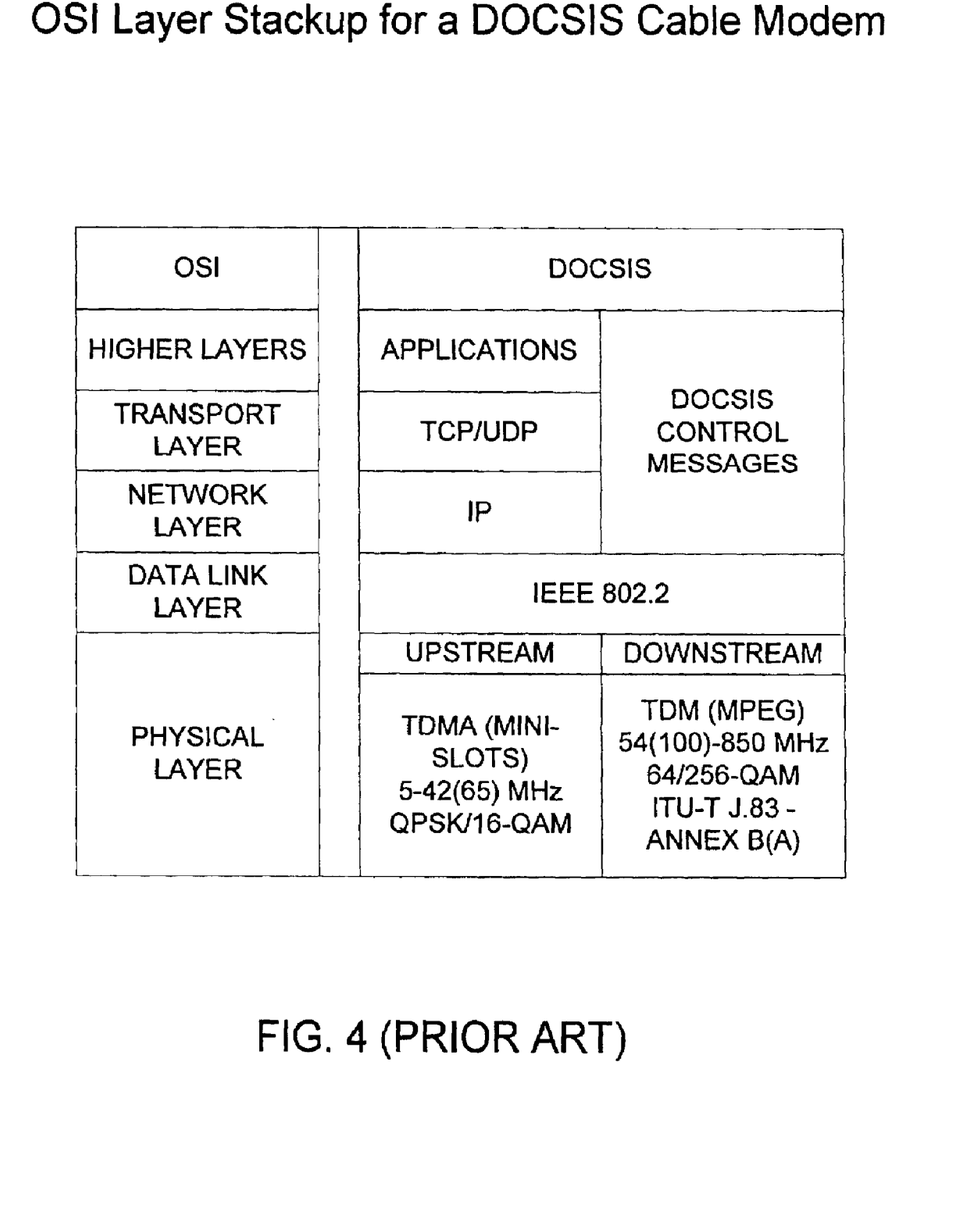
FIG. 4 illustrates an Open Systems Interconnection chart for a DOCSIS cable modem.

FIG. 4 illustrates an OSI (Open Systems Interconnection) chart for a Data Over Cable Service Interface Specifications (DOCSIS) cable modem, the current standard used by U.S. cable systems. The frequency values in parenthesis in the chart refer to the European DOCSIS, which is a version of the DOCSIS 1.0/1.1 with a modified physical layer targeted for the European market.

In DOCSIS standard, the general method for obtaining access to the upstream medium is a request-grant, also referred to as demand assignment multiple access. When a packet arrives into the CM's 14 upstream transmit queue, a request is made to transmit the packet to the CMTS 4. This request can be made as a standalone request, or it can be piggybacked on other data. The request includes the Service ID for which the request is being made and the number of mini-slots that is being requested. When the request is received by the CMTS 4, the CMTS 4 will grant the request in the downstream MAP message and inform the CM 14 of the time of its transmission opportunity.

In DOCSIS, the CM 14 request is made in mini-slot units and includes the physical layer (PHY) overhead. A mini-slot is some power-of-two multiple of 6.25 microseconds and corresponds to a power-of-two number of bytes. The mini-slot size for an upstream channel is defined in the Upstream Channel Descriptor (UCD) message.

Since the CM 14 request includes the PHY overhead, this implies that before making the request, the CM 14 formulates its calculation based on a specific burst profile; otherwise, it could not properly include in the request the specific PHY overhead needed. The DOCSIS specification currently defines 6 different burst types, and each burst type corresponds to a burst profile. However, only two of these burst types are used for data that is transmitted after it has been requested, Short Data Grant and Long Data Grant. The other 4 burst types pertain to initial ranging, periodic ranging, request opportunities, and contention data modes.

The CM 14 has to determine whether the Short Data Grant or the Long Data Grant is to be used. First, the CM 14 determines the number of mini-slots required to transmit the data based on the Short Data burst descriptor parameters. Second, if the number of mini-slots is equal to or less than Maximum Burst Size defined by the Short Data burst descriptor, then the request is the number determined in the first step. Third, if the number of mini-slots is greater than Maximum Burst Size defined by the Short Data burst descriptor, the CM 14 determines the number of mini-slots required to transmit the data based on the Long Data burst descriptor parameters. Fourth, if the number of mini-slots calculated in the third step is equal to or less than Maximum Burst Size defined for the Short Data burst descriptor, the CM 14 increases the mini-slot request to at least one greater than the Maximum Burst Size. The fourth step is needed so that the CMTS 4 knows whether the CM 14 is assuming the Short Data or Long Data profile.

The formulas for computing the number of mini-slots for either Short or Long Data Grant are detailed below. In particular, the mini-slot request takes into account the size of the DOCSIS MAC Protocol Data Unit (PDU) plus the burst preamble, the Reed-Solomon parity, and the guard time.

The CM makes the following computation to determine the number of mini-slots to request in either Short or Long Data Grant burst profile:

B=number of bytes in the frame including all DOCSIS MAC headers

K=information bytes per codeword

Py number of parity bytes per codeword

PG=number of bytes for the preamble and guard time

M=number of bytes per mini-slot

In fixed length codeword mode, given B bytes to transmit, J=⌈B/K⌉ codewords are needed. Then T=J*(K+Py)+PG total bytes are needed, which means that m=⌈T/M⌉=F⌈[J*(K+Py)+PG]/M⌉ mini-slots must be requested by the CM.

In shortened last codeword mode, given B bytes to transmit, J=⌊B/K⌋ full-length codewords are needed. Thus, k1=(B−J*K) bytes are left to be coded.

k2=0, if k1=0

16, if k1 is between 1 and 16 bytes k1, if k1 is 16 up to K−1 bytes

If k2=0, T=J*(K+Py)+PG total bytes are needed, which means that m=⌈T/M⌉=⌈[J*(K+Py)+PG]/M⌉ mini-slots must be requested by the CM. If k2≠0, this means T=(k2+Py)+J*(K+Py)+PG total bytes are needed, which means that m=⌈T/M⌉=⌈[(k2+Py)+J*(K+Py)+PG]/M⌉ mini-slots must be requested by the CM.

In the DOCSIS specification, the PHY burst profile corresponds one-to-one with an Interval Usage Code (IUC) at the MAC layer. In the specification, each burst profile is statically associated with an IUC number. For example, the Short Data Grant is associated with an IUC value of 4.

The IUC codes are used in two different MAC Management Messages: (1) the UCD message; and (2) the MAP message. In the UCD, all burst profile parameters are defined, and each set of parameters is associated with its particular IUC. As mentioned before, the specification defines only 6 IUCs that are associated with burst profiles corresponding to Initial Maintenance, Periodic Maintenance, Request, Request/Data, Short Data, and Long Data.

The other use of IUC codes in MAC Management Messages is in the MAP message. A grant (i.e., an Information Element) in a MAP includes 3 pieces of information (1) an indication of when the transmission opportunity begins, (2) the Service ID to which the grant is given, and (3) the IUC. The IUC in the grant is expected to be the IUC associated with the burst profile that was assumed in making the request. In other words, the CM normally will see in the grant the IUC corresponding to the burst profile that it assumed in making the request.

Summarizing from above, under the current DOCSIS standard, (1) only two upstream burst profiles are available for data that is granted, (2) there are rules defining which of the two burst profiles is used based mainly upon MAC PDU length, and (3) all CMs on the same upstream channel use the same burst profiles.

The major limitation from the current standard is that only two burst profiles are used. For example, suppose on an upstream channel, some CMs can achieve adequate upstream Bit Error Rate (BER) performance using 16-QAM and a relatively low error-correcting Reed-Solomon code, while others require QPSK and more Reed-Solomon error correction. If these CMs all run on the same upstream channel and it is desired to provide all CMs with adequate BER performance, the burst profile parameters will have to accommodate the CMs experiencing the less robust transmission. However, this is a sacrifice to the CMs which can successfully use 16-QAM and less Reed-Solomon parity, and this is a limitation to the system as a whole because the capacity of the upstream channel could be more efficiently utilized by some CMs by using a higher order of modulation or less Reed-Solomon parity. On the other hand, if the CMTS, through its upstream RF monitoring capabilities, can ascertain specific CMs that suffer inadequate error rate performance and then could assign more robust burst profiles to those CMs, this could benefit those CMs while allowing others to use the most system-efficient burst profiles. The system as a whole achieves greater bandwidth efficiency through the exercise of the PHY flexibility.

For Additive White Gaussian Noise, impulse noise, or narrowband ingress, the noise "funneling" effect of the upstream HFC system (by nature of the topology) impacts all subscribers on that upstream channel. Knowledge of the level of these impairments on the upstream channel assists in determining the baseline burst profile parameters that are to be set to make the upstream transmission robust. This can be accomplished in an automated fashion by using a CMTS with advanced channel monitoring capabilities. However, there are other impairments that do not impact all CM signals received in the upstream, but may only impact a particular CM or CMs on a segment of the systems. For example, impairments and distortion can be due to a tap or amplifier that is malfunctioning or has degraded. Also, for example, a CM's return signal is transmitted through a cascade of many coax amplifiers while a different CM's return signal is transmitted through one amplifier. In these cases, it would be possible for the CMTS, through its channel monitoring functions, to ascertain which CMs are impacted and have less reliable transmission, and it would be beneficial if these CMs can be assigned upstream burst profiles that could better overcome their localized or path-specific impairments.

SUMMARY OF THE INVENTION

In view of the above-described problems of the prior art, it is an object of the present invention to provide a method for increasing physical layer flexibility in cable modem systems. The present invention enables the CMTS to assign burst profiles and number of mini-slots to the CMs according to the CMs' robustness level. This is accomplished using the following method. First, the CMTS maintains the performance statistics of each CM. Next, when the CM performs a bandwidth request to the CMTS, the CMTS determines whether the CM is dynamic burst profile mode capable. If so, then the CMTS assigns a burst profile based on performance measurements on the CM and grants the CM a number of mini-slots per the burst profile parameters and the CM's request. Otherwise, if the CM is not dynamic burst profile mode capable, the CMTS assigns a burst profile per the current DOCSIS specification and assigns a number of min-slots per CM's request.

BRIEF DESCRIPTION OF THE DRAWINGS

These and other objects, features and advantages of the present invention are better understood by reading the following detailed description of the preferred embodiments, taken in conjunction with the accompanying drawings, in which.

DETAILED DESCRIPTION OF THE PREFERRED EMBODIMENTS

The present invention will now be described in greater detail, which will serve to further the understanding of the preferred exemplary embodiments of the present invention. As described elsewhere herein, various refinements and substitutions of the various embodiments are possible based on the principles and teachings herein.

The preferred embodiments of the present invention will now be described with reference to FIG. 5, wherein like components, frequencies, data rates, etc. are designated by like reference numerals throughout the various figures. Further, specific details and parameters are provided herein and are intended to be explanatory rather than limiting.

Figure 5:
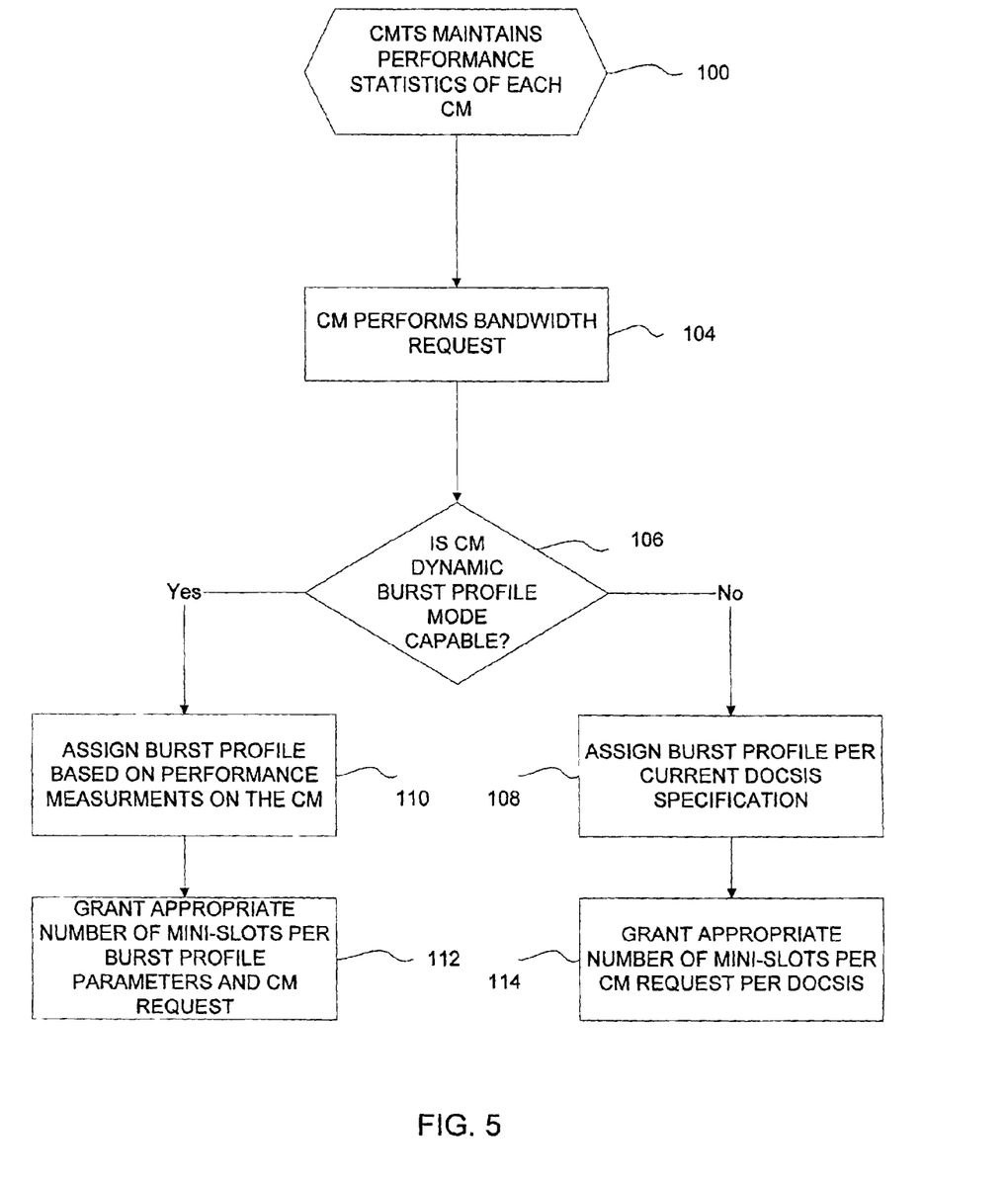
FIG. 5 illustrates a flow diagram of a method for increasing the physical layer flexibility in cable modem systems in accordance with the present invention.

FIG. 5 illustrates a flow diagram of a method for increasing the physical layer flexibility in cable modem systems in accordance with the present invention. In step 100, the CMTS maintains the performance statistics of each CM. When the CM performs a bandwidth request to the CMTS in step 104, the CMTS determines whether the CM is dynamic burst profile mode capable in step 106. This can be performed either as part of the CM Registration in which the CM indicates that it is capable of dynamic burst profile mode capable and the CMTS acknowledges it, or by an indication in the bandwidth request itself. If the CM is dynamic burst profile mode capable, then the CMTS assigns a burst profile based on the CM performance measurements and the level of robustness needed, and grants the CM a number of mini-slots per the burst profile parameters and CM request in step 112. Otherwise, if the CM is not dynamic burst profile mode capable as determined in step 106, the CMTS assigns burst profile per the current DOCSIS (industry-wide) specification in step 108, and grants the CM a number of mini-slots to the CM per DOCSIS specification in step 114. These steps are described in greater detail below. It is important to note that the present invention is not limited the DOCSIS specification as known at the time of the invention, but is also applicable for use with other industry-wide specification that are later implemented.

The following example describes in greater detail how a burst profile can be assigned to a particular CM if the CM is dynamic burst profile mode capable. This example describes three different burst profiles, although a larger number of profiles can be used:

Burst Profile 1: Highly Robust

| Burst Profile Attributes | |
|---|---|
| Modulation | QPSK |
| Differential Encoding | Off |
| Preamble Length | 180 |
| R-S Error Correction (T bytes) | 10 |
| R-S Codeword Information Bytes (k) | 80 |
| R-S Shortened Last Codeword | On |
| Scrambler Seed | 142 |
| Maximum Burst Length (minislots)$^a$ | 0 |
| Guard Time | 8 |
| Scrambler On/Off | On |

Burst Profile 2: Moderately Robust

| Burst Profile Attributes | |
|---|---|
| Modulation | QPSK |
| Differential Encoding | Off |
| Preamble Length | 100 |
| R-S Error Correction (T bytes) | 4 |
| R-S Codeword Information Bytes (k) | 100 |
| R-S Shortened Last Codeword | On |
| Scrambler Seed | 142 |
| Maximum Burst Length (minislots)$^a$ | 0 |

-continued

| Burst Profile Attributes | |
|---|---|
| Guard Time | 8 |
| Scrambler On/Off | On |

Burst Profile 3: Less Robust

| Burst Profile Attributes | |
|---|---|
| Modulation | 16-QAM |
| Differential Encoding | Off |
| Preamble Length | 64 |
| R-S Error Correction (T bytes) | 2 |
| R-S Codeword Information Bytes (k) | 120 |
| R-S Shortened Last Codeword | On |
| Scrambler Seed | 142 |
| Maximum Burst Length (minislots)$^a$ | 0 |
| Guard Time | 8 |
| Scrambler On/Off | On |

In this example, using three burst profiles, the key parameters that relate to robustness of the burst profile are the modulation type, the length of the preamble, the amount of Reed-Solomon error correction (T bytes), and the size of the Reed-Solomon codeword (k). The higher order the modulation type (e.g., 16-QAM is higher order than QPSK, 64-QAM is higher order than 16-QAM) with all other factors remaining constant, the less robust the transmission will be due to the higher signal-to-noise ratio required by higher order modulation schemes to achieve the same BER. The shorter the preamble with all other factors remaining constant, the less robust the transmission will be due to a fewer number of symbols on which the CMTS demodulator can train upon (for example, to derive modulation symbol timing or to implement an equalizer). The smaller the Reed-Solomon error correction T parameter is with all other factors remaining constant, the less robust the transmission will be due to a lower level of error correcting capability of the code. Finally, the larger the codeword size is with all other factors remaining constant, the less robust the transmission will be due to the larger number of symbols in the codeword that can be in error, and thus, possibly exceed the error correction capability (the T value) of the code.

Now, suppose there are three CMs that the CMTS has performed measurements on based upon their upstream transmissions using an identical burst profile. If CM1 shows a relatively high codeword error rate or packet loss rate and a relatively low signal-to-noise ratio and a Modulation Error Rate (MER), then the CMTS can assign CM1 the Highly Robust burst profile for its next upstream transmission because CM1 requires the additional robustness provided this particular burst profile. If CM2 shows a moderate codeword error rate or packet loss rate and a moderate signal-to-noise ratio or MER, then CM2 can be assigned the Moderately Robust burst profile that provides a balance between robustness and bandwidth efficiency. Next, if CM3 has virtually no codeword errors or packet loss and experiences a very high signal-to-noise ratio or MER, then CM3 can be assigned the Low Robustness burst profile and operate in a highly efficient mode in which the physical layer overhead is minimized. In general, given a CM's performance measurements using any burst profile, the CMTS can decide whether to change its burst profile to add more robustness (and thus, have less bandwidth efficiency) or to change its burst profile to possibly eliminate unnecessary robustness (and thus, operate in a more bandwidth efficient mode).

As mentioned above, a larger number of burst profiles (i.e., more than three) can be used to provide more levels of robustness. In addition, burst profiles can also take into account the size of packets. For example, certain burst profiles may be geared for small packets versus medium packets versus large packets. Thus, there could be a different burst profile for every combination of packet size and robustness level.

The present invention provides greater PHY flexibility in the DOCSIS specification in order to obtain a superior request-grant mechanism. This is accomplished by providing a Upstream Channel Descriptor ("UCD") message that includes an increased number of burst profiles that can be used to send data that has been granted. For example, sixteen burst profiles can be provided in the UCD, which can easily fit into a maximum-size Ethernet frame. The DOCSIS frame carrying the UCD with 16 burst profiles is approximately 800 bytes in length.

In addition, when operating in dynamic burst profile mode, the CM requests do not need to include the PHY overhead of a presumed burst profile. The CM obtains the number of data bytes that are needed and converts them to mini-slots in accordance to the following computation:

B=number of bytes in the frame including all DOCSIS MAC headers; and

M=number of bytes per mini-slot.

The CM makes a request of m=⌈B/M⌉ mini-slots.

In addition, the CMTS specifies in grants within a MAP message the burst profile that is used. This mechanism currently exists in the format of the Information Elements defined in the MAP message per DOCSIS. The CMTS selects the burst profile based on the robustness of the transmissions being received from a particular CM as measured by the CMTS. The selection of the burst profile involves a trade-off between robustness and bandwidth efficiency. The CMTS selects a robust burst profile (e.g., a lower order of modulation, a high degree of Forward Error Correction capability) for a CM whose received bursts have significant errors. The CMTS selects a more bandwidth efficient burst profile (e.g., a higher order of modulation, a low degree of Forward Error Correction capability) for a CM whose received bursts contain fewer errors. Depending on the number of burst profiles provided in the UCD that reflects differing degrees of robustness versus efficiency, the CMTS can provide various numbers of robustness levels in the assigned burst profiles.

The size of grants provided by the CMTS to the requesting CM include the PHY overhead required to transmit the PDU, which is based upon the assigned burst profile. In order to do so, the CMTS first has to do a calculation to compute the maximum number of data bytes that can be accommodated by the request in units of mini-slots. This calculation is as follows:

m=the number of mini-slots that were requested

M=number of bytes per mini-slot

Maximum number of data bytes=$B_{max}$=m*M

Next, the CMTS schedules a grant with the proper number of mini-slots after selecting the burst profile. This calculation is performed as follows:

K=information bytes per codeword

Py=number of parity bytes per codeword

PG=number of bytes for the preamble and guard time

M=number of bytes per mini-slot

In fixed length codeword mode, given $B_{max}$ bytes to transmit, J=⌈$B_{max}$/K⌉ codewords are needed. This means that T=J*(K+Py)+PG total bytes are needed, which means that m=⌈T/M⌉=⌈[J*(K+Py)+PG]/M⌉ mini-slots are allocated by the CMTS to the CM. In shortened last codeword mode, given B bytes to transmit, J=⌊$B_{max}$/K⌋ full-length codewords are needed.

Thus, k1=($B_{max}$−J*K) bytes are left over needing to be coded.

k2=0, if k1=0

16, if k1 is between 1 and 16 bytes k1, if k1 is 16 up to K−1 bytes

If k2=0, T=J*(K+Py)+PG total bytes are needed, which means that m ⌈T/M⌉=⌈[J*(K+Py)+PG]/M⌉ mini-slots are allocated by the CMTS to the CM. If k2≠0, this means T=(k2+Py)+J*(K+Py)+PG total bytes are needed, which means that m=⌈T/M⌉=⌈[(k2+Py)+J*(K+Py)+PG]/M⌉ mini-slots are allocated by the CMTS to the CM.

The CM should be able to support at least 16 burst profiles for granted data. The CMTS can provide more burst profiles in the UCD, but there would be rules defining the precedence of burst profiles to be incorporated by the CM. For example, the CM would be able to use the first n burst profiles in the UCD given that it can store n different burst profiles. In addition, during the registration process, the CMs should report to the CMTS in the Modem Capabilities settings in the REG-REQ how many burst profiles for granted data they can support. Thus, the CMTS could make use of additional burst profiles for CMs that are known to handle extra burst profiles.

In order for DOCSIS 1.0/1.1 CMs to coexist with a CMTS that is capable of handling requests with and without PHY overhead, methods are needed for the CMTS to determine whether the request includes PHY overhead or not. There are at least two methods for performing such a task.

First, during registration, a CM as part of its modem capabilities settings indicates whether it is capable of making requests without PHY overhead. Through the registration process, the CMTS will be able to identify the CMs that can request without assuming PHY overhead. Even if in later specifications, all CMs are required to support requests without PHY overhead, a separate "switch" can be used for determining whether the CMTS desires that CMs use this capability or not.

Second, within each upstream packet, there is an indication in the DOCSIS MAC header that the request is not "burdened" with PHY overhead. To be compatible with existing DOCSIS 1.0/1.1 CMs, the DOCSIS MAC header would not change for CMs that request according to the DOCSIS 1.0/1.1 rules, but it would be different for CMs with the capability of requesting to the different rules. For example, setting the FC_PARM[4] bit equal to 1 in the DOCSIS MAC header could be used to indicate a request without PHY overhead. This would apply to a standalone Request PDU and to a Variable Length Packet PDU, MAC Management PDU, a PDU within a concatenation, or a fragmented packet carrying a piggybacked request.

The following are requirements for the CM to support the dynamic burst profile assignment capability as described in FIG. 5:

(1) The upstream physical layer implementation of the CM should be capable of supporting multiple burst profiles (e.g., at least 16 upstream burst profiles);

(2) The CM should be capable of receiving multiple burst profiles in a UCD message;

(3) The CM should be capable of adding the following Modem Capabilities TLV into the Registration Request message:

| Type | Length | Value |
|---|---|---|
| 5.xx | 1 | 0 = CM not capable of dynamic use of burst profiles |
| | | 1 = CM is capable of dynamic use of burst profiles |

(4) The CM should be capable of adding the following Modem Capabilities TLV into the Registration Request message:

| Type | Length | Value |
|------|--------|-------|
| 5.xx | 1 | number of burst profiles that can be handled by the CM |

Suppose that the number of burst profiles that can be handled by the CM is equal to n. This presumes that the CM stored the first n burst profiles in the UCD, or if the number of burst profiles in the UCD is less than n, the CM stored all of the burst profiles in the UCD.

(5) The CM should be capable of operating in dynamic burst profile mode if a Registration Response is received from the CMTS with the Dynamic Burst Profile Modem Capabilities setting set to 1;

(6) The CM should be capable of operating in the normal burst profile mode if a Registration Response is received from the CMTS with the Dynamic Burst Profile Modem Capabilities setting set to 0;

(7) When the CM operates in Dynamic Burst Profile mode, the CM should be capable of using the burst profile corresponding to the Interval Usage Code specified in the Information Element in the MAP; and (8) When the CM operates in Dynamic Burst Profile mode, the CM should be capable of performing requests in units of mini-slots that do not include PHY overhead.

The following are requirements for the CMTS to support the dynamic burst profile reference platform as described in FIG. 5:

(1) The CMTS should be capable of providing multiple burst profiles in a UCD message;

(2) The CMTS upstream demodulator should be capable of supporting multiple upstream burst profiles in immediate burst-by-burst fashion;

(3) If a MAC Domain has been enabled for Dynamic Burst Profile mode, the CMTS should include the Dynamic Burst Profile Modem Capabilities TLV with the value set to 1 in a Registration Response message if the Registration Request is received with the same TLV and the value is set to 1. The Dynamic Burst Profile Modem Capabilities TLV is composed of TLV fields that are a sub-type within the overall Modem Capabilities configuration setting string. The specific encoding is defined as follows.

| Type | Length | Value |
|------|--------|-------|
| 5.xx | 1 | 0 = CM commanded not to be in Dynamic Burst Profile<br>1 = CM is commanded to use Dynamic Burst Profile mode |

(4) If a Registration Request is received with a Dynamic Burst Profile Modem Capabilities TLV setting with the value set to 0, the CMTS should be capable of including the Dynamic Burst Profile Modem Capabilities TLV into the Registration Response with the value set to 0;

(5) If a MAC Domain (a collection of upstream and downstream channels related to each other and managed together under one MAC Management entity) has not been enabled for Dynamic Burst Profile mode, for a CM registering on that MAC Domain, the CMTS should be capable of including the Dynamic Burst Profile Modem Capabilities TLV with the value set to 0 in a Registration Response message if the Registration Request is received with this same TLV with the value set to 0 or 1; and (6) If a Registration Request is received with no Dynamic Burst Profile Modem Capabilities TLV setting, the CMTS should assume that the CM is not capable of Dynamic Burst Profile mode and not put the Dynamic Burst Profile Modem Capabilities TLV into the Registration Response.

(7) The CMTS should be able to use the specific information in a Registration Request from a CM concerning the number of burst profiles that can be handled by the CM encoded in the following Modem Capabilities TLV in the Registration Request message:

| Type | Length | Value |
|------|--------|-------|
| 5.xx | 1 | number of burst profiles that can be handled by the CM |

If the CMTS learns that the CM is capable of handling more burst profiles than some predetermined minimum number (16 as specified earlier), the CMTS can assign to this CM any burst profile from a larger pool of burst profiles than just the minimum number. Let n be the number of burst profiles that a CM can store. Then, the CMTS will assume that the CM stored the first n burst profiles in the UCD message, or if the number of burst profiles in the UCD message is less than n, the CM stored all the burst profiles in the UCD.

The following requirements assume that Dynamic Burst Profile mode is enabled for a particular MAC domain:

(1) The CMTS should be capable of recognizing a bandwidth request from a Dynamic Burst Profile enabled CM on this MAC Domain and assume that the request does not include PHY overhead (as mentioned earlier, two methods are (a) in the CM registration process, the CM communicated with the CMTS that it is dynamic burst profile mode capable, and the CMTS acknowledged it and (b) within each burst, the setting of the FC_PARM[4] bit equal to 1 in the DOCSIS MAC header could be used to indicate a request without PHY overhead).

(2) In response to a bandwidth request from a Dynamic Burst Profile enabled CM, the CMTS should be capable of selecting a burst profile, grant the number of mini-slots that includes the necessary PHY overhead for the burst profile, and specify the IUC code corresponding to the selected burst profile in the grant. The selected burst profile should not correspond to IUC=1, 2, 3, or 4. The CMTS scheduler is required to make the assumption that the amount of data that the CM is requesting to send is equivalent to the maximum amount of data that can fit into the number of requested mini-slots: in other words, number of mini-slots multiplied by bytes per mini-slot;

(3) The CMTS should be capable of selecting a burst profile for a Dynamic Burst Profile enabled CM based using an algorithm that considers the information on error performance, signal-to-noise ratio, or modulation error ratio of the CM that is provided by the CMTS. The CMTS shall select more robust burst profiles for CMs that need more robust transmission based upon the upstream error monitoring. The CMTS should be capable of using more bandwidth efficient burst profiles for CMs that do not have transmission problems due to localized impairments or impairments unique to their upstream paths. "More robust" implies burst profiles with a lower order of modulation, more Reed-Solomon parity bytes relative to the number of information bytes per codeword, longer preamble lengths relative to information bytes per codeword. Using a lower order of modulation, more Reed-Solomon parity, and longer preamble lengths decrease bandwidth efficiency. Thus, there is the robustness versus bandwidth efficiency tradeoff; and (4) The CMTS should be capable of measuring the following counts on a per CM basis in order to determine appropriate burst profiles to assign:

Total received codewords

Uncorrectable codewords

Correctable errored codewords

Missed detections (i.e., non-acquisition of upstream bursts)

Modulation Error Ratio (purity of channel)

Signal to Noise Ratio

Packet Loss

Echo Delay Spread (measurement of Amplitude of echo and its delay).

The CMTS can implement the present invention with a subset of these measurements or with additional measurements as known in the art.

The presently preferred embodiment of the invention is implemented with the above-described processes. However, it is important to note that the present invention is applicable with more or less number of processes than those described above.

In the previous descriptions, numerous specific details and examples are set forth such as specific burst profiles, number of burst profiles, measurements, bytes, standards, specifications, formats, etc., to provide a thorough understanding of the present invention. However, as one having ordinary skill in the art would recognize, the present invention can be practiced without resorting to the details and examples specifically set forth. Those skilled in the art will readily appreciate that many modifications of the exemplary embodiments are possible without materially departing from the novel teachings and advantages of this invention.

I claim:

1. A method of granting mini-slots to a cable modem (CM) by a cable modem termination system (CMTS), the method comprising:

maintaining performance statistics of the CM by the CMTS;

receiving a bandwidth request by the CMTS from the CM;

determining whether the CM is dynamic burst profile mode capable after receiving the bandwidth request; and if the CM is determined to be dynamic burst profile mode capable, assigning a burst profile and granting mini-slots to the CM based on the burst profile and the bandwidth request; and if the CM is determined not to be dynamic burst profile mode capable, assigning another burst profile and granting mini-slots to the CM based on the another burst profile and the bandwidth request.

2. A method according to claim 1, wherein the assigning of the another burst profile is based on industry standards.

3. A method according to claim 2, wherein the industry standards comprise Data Over Cable Service Interface Specifications (DOCSIS).

4. A method according to claim 1, wherein the assigned burst profile is based on performance measurements and a robustness level of the CM.

5. A method according to claim 1 wherein a robustness level of the assigned burst profile is determined by a modulation type, a length of a preamble, an amount of Reed-Solomon error corrections, and a size of a Reed-Solomon codeword.

6. A method according to claim 1 further comprises using a registration process for determining whether the CM is dynamic burst profile mode capable.

7. The method of claim 6, further comprising:

reporting, by the CM to the CMTS during the registration process, a number of burst profiles for granted data that the CM can support.

8. A method according to claim 1 further comprising using the bandwidth request for determining whether the CM is dynamic burst profile mode capable.

9. The method of claim 1, further comprising:

receiving, by the CM, an upstream channel descriptor message including a plurality of burst profiles from the CMTS if the CM is determined to be dynamic burst profile mode capable.

10. The method of claim 1, wherein:

the assigning the burst profile comprises specifying an Interval Usage Code, corresponding to the burst profile, in a MAP message.

11. A method for increasing physical layer flexibility in a cable modem system, the cable modem system including a cable modem (CM) coupled to a cable modem termination system (CMTS) through an access network, the method comprising;

providing the CMTS that is capable of maintaining performance statistics of the CM and receiving a bandwidth request from the CM;

determining whether the CM is dynamic burst profile mode capable;

assigning a burst profile from a plurality of burst profiles communicated to the CM; and granting mini-slots to the CM, the number of mini-slots granted to the CM dependent on whether the CM is dynamic burst profile mode capable.

12. A method according to claim 11, wherein the assigned burst profile is dependent on whether the CM is dynamic burst profile mode capable.

13. A method according to claim 12, wherein if the CM is not dynamic burst profile mode capable, the assigned burst profile is based on industry standards.

14. A method according to claim 13, wherein the industry standards comprise Data Over Cable Service Interface Specifications (DOCSIS).

15. A method according to claim 11, wherein if the CM is dynamic burst profile mode capable, the assigned burst profile is based on performance measurements and a robustness level of the CM.

16. A method according to claim 15, wherein the robustness level of the assigned burst profile is determined by modulation type, a length of a preamble, an amount of Reed-Solomon error corrections, and a size of a Reed-Solomon codeword.

17. A method according to claim 11 further comprises determining whether the CM is dynamic burst profile mode capable using a registration process.

18. The method of claim 17, further comprising:

reporting, by the CM to the CMTS during the registration process, a number of burst profiles for granted data the cable modem can support.

19. A method according to claim 11 further comprises determining whether the CM is dynamic burst profile mode capable using a bandwidth request of the CM.

20. The method of claim 11, further comprising:

receiving, by the CM, an upstream channel descriptor message including a plurality of burst profiles from the CMTS if the CM is determined to be dynamic burst profile mode capable.

21. The method of claim 11, wherein:

the assigning the burst profile comprises specifying an Interval Usage Code, corresponding to the burst profile, in a MAP message.

* * * * *